May 14, 1935.	M. C. H. JACQUEMIN	2,001,612
PIPE FOR SMOKING
Filed June 24, 1933
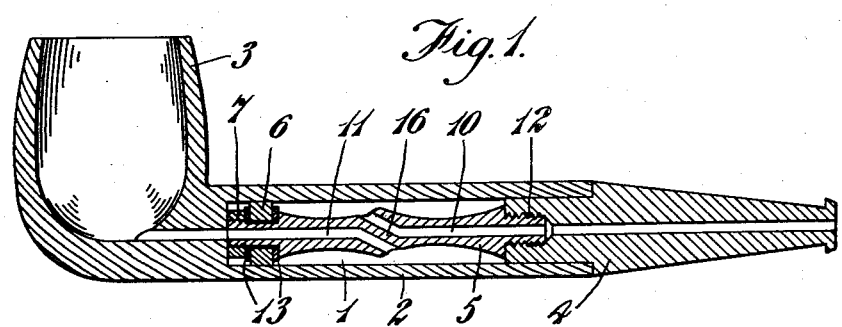
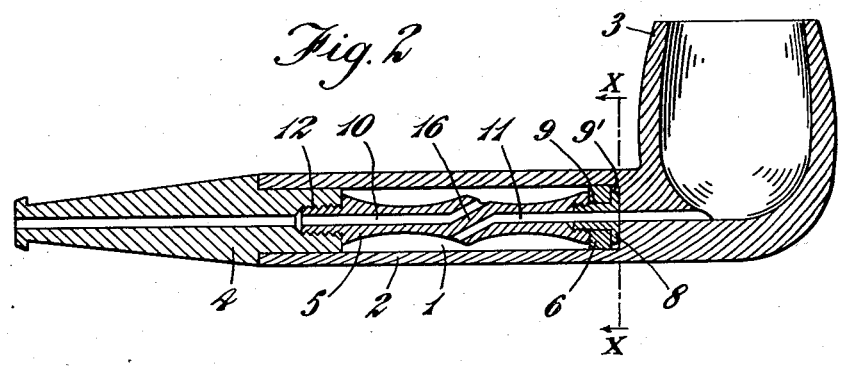
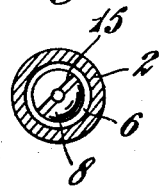
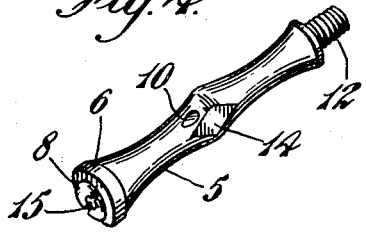
INVENTOR
Marcel C. H. Jacquemin
By
ATTORNEY Patented May 14, 1935

2,001,612

UNITED STATES PATENT OFFICE 2,001,612

PIPE FOR SMOKING

Marcel Charles Henri Jacquemin, New Barking, England

Application June 24, 1933, Serial No. 677,502
In Great Britain September 17, 1932

2 Claims. (Cl. 131—12)

This invention relates to improvements in pipes for smoking, of the kind wherein the stem of the pipe is bored to form a collecting chamber in which nicotine or other matter from the bowl of the pipe and saliva or moisture from the mouth of the smoker are trapped, and has for its object to provide improved means for preventing the contents of such chamber from reaching the bowl of the pipe in which the tobacco is consumed.

In accordance with the invention, the means for preventing nicotine or saliva in the collecting chamber from passing into the bowl of the pipe comprises a resilient washer or washers mounted on an inward extension of the mouthpiece of the pipe and engaging with the wall of the collecting chamber so as to form a fluid-tight joint therewith. The said washer or washers serve to ensure that any nicotine or other matter passing from the bowl of the pipe into the collecting chamber shall remain in such chamber, as shall also any saliva or moisture that passes into the collecting chamber from the mouth of the smoker. The said washer also serves as a means for effectually discharging the contents of the collecting chamber when the mouthpiece is withdrawn.

In the accompanying drawing, constructional forms of the invention hereinafter more particularly described are shown by way of example. In the said drawing, Figure 1 is a central section through a pipe constructed in accordance with the invention.

Figure 2 is a view similar to Figure 1 showing a modified form of construction.

Figure 3 is a section on the line X—X, Figure 2, and

Figure 4 is a perspective view of part of a pipe in accordance with the invention hereinafter referred to.

In the drawing, a chamber 1 formed in a stem 2 of a pipe is closed at the end thereof remote from the bowl 3 of the pipe by the inner end of a mouthpiece 4, which is of any suitable form and is made from ebonite, vulcanite or like material. In the said inner end of the mouthpiece 4, within the chamber 1 formed in the stem 2, there is secured, e. g. by screwing, or in any other convenient manner, a suction tube or extension 5, at the end of which, adjacent the bowl 3, a resilient washer 6 is provided.

Pipes constructed in accordance with this invention are provided with stems of any convenient dimensions, which are always such that the collecting chamber formed within the stem may be of sufficient size to accommodate readily the maximum amount of nicotine, waste products of combustion and saliva that may be expected to be produced, and the said collecting chamber preferably extends throughout the major part of the length of the stem. The tube 5, mounted upon the mouthpiece 4, preferably extends to the end or substantially to the end of the chamber adjacent to the bowl of the pipe, so that the resilient washer is situated in the near proximity of the end wall of the chamber adjacent the bowl.

A resilient washer or swab 6 is mounted or secured in position upon the suction tube 5 in any convenient manner, for example, as shown in Figure 1, by means of a nut 7 screwed on to the end of the suction tube, or as shown in Figures 2 to 4, by means of an externally screw-threaded bush 8, having a central bore and a cylindrical surface 9 and flange 9' thereon to receive the washer 6, the said bush 8 being adapted to be screwed into the end of the suction tube 5.

The resilient washer 6 is formed of a material which is not deleteriously affected by nicotine, moisture or heat, such as, for example, indurated fibre, leather, or india-rubber, and is provided of such a size as to be a close sliding fit within the collecting chamber. Through the adjustment of the nut 7 or the bush 8, said swab or washer 6 is compressed and radially expanded to maintain effective sealing and wiping engagement with the wall of the chamber.

The tube 5 preferably comprises two separate conduits 10, 11, the conduit 10 leading upwards from the bore of the mouthpiece 4 into the collecting chamber 1, and the conduit 11 leading downwards into the collecting chamber from the bore of the bowl 3. The two conduits are separated from each other by a partition 16. The said tube may be made of aluminium or other suitable metal or material, and is secured in the mouthpiece 4 by means of a screw-threaded stem 12, screwing into a socket formed in the mouthpiece 4, or in any other suitable manner, permitting adjustment, if necessary, to compensate for adjustment of said nut 7 or bush 8.

If desired, and in cases where the stem of the pipe is of relatively large diameter, small metal washers 13 may be provided on either side of the resilient washer 6, as shown in Figure 1, to ensure that the washer has sufficient rigidity to form a fluid-tight joint with the walls of the chamber 1, and to hold the washer more securely in its position at the end of the tube 5 adjacent the bowl 3.

Flats 14 are conveniently formed on the suction tube 5 to enable the same to be gripped readily when the tube is screwed into its socket in the mouthpiece 4, and a slot 15 is provided on the bush 8 adapted to receive a screw-driver, the edge of a coin, or the like, to enable the bush to be screwed home into the tube 5.

When a pipe constructed in accordance with the invention is in use, smoke is drawn from the burning tobacco in the bowl 3 of the pipe through the downwardly opening conduit 11 of the suction tube 5, and is discharged into the collecting chamber 1, together with any moisture or liquid distilled off from the tobacco in the combustion thereof. The smoke is then drawn by the suction exerted by the smoker into the upwardly opening conduit 10 formed in the suction tube and through the bore of the mouthpiece 4 to the mouth of the smoker. Any saliva which may pass into the mouthpiece of the pipe from the mouth of the smoker cannot reach the burning tobacco in the bowl of the pipe, since it is trapped and remains in the collecting chamber 1.

As will be seen, a pipe constructed in accordance with the invention affords a very cool smoke, since any nicotine or other liquid proceeding from the burning tobacco in the bowl 3 is trapped in the collecting chamber 1, and cannot flow past the resilient washer 6 into the pipe bowl. It is thus not burnt and the fumes therefrom do not pass into the mouth of the smoker. Furthermore, as a result of the trapping in the collecting chamber 1 of such waste products of combustion from the bowl of the pipe, and also of any moisture from the mouth of the smoker which may pass into the mouthpiece, the tobacco in the bowl is kept dry and may be burnt to the end, nothing being left but ash, instead of the usual "dottle" of unburnt and half-burnt tobacco saturated with nicotine and other waste products of combustion and the saliva of the smoker.

A further advantage of pipes constructed in accordance with the invention is that the same are readily cleaned, the withdrawal of the mouthpiece 4 and the suction tube 5 secured thereto causing the resilient washer 6 mounted on the end of the suction tube adjacent the bowl to serve as a cleaning implement for removing from the collecting chamber 1 any moisture or other undesirable matter that may have collected therein.

I claim:

1. A tobacco pipe comprising a hollow stem having a cylindrical collecting chamber therein, a mouthpiece removably arranged in the stem, a tubular extension of the mouthpiece disposed in said chamber and a resilient swab arranged substantially on the end of the tubular extension and peripherally contacting with the wall of the collecting chamber to form a fluid-tight joint with the said wall, said tubular extension having its peripheral surface spaced from said wall between said swab and the junction of said extension with the mouthpiece proper, and having at substantially the centre of its length an annular enlargement, into the upper and lower parts of which open passages extending to the bore of the mouthpiece and the end of the extension next to the bowl respectively.

2. A tobacco pipe comprising a bowl provided with a stem having a longitudinally extending chamber therein, said chamber having a substantially perpendicular wall at its inner end and a passage opening into said perpendicular wall and communicating with the lower part of the bowl, a mouthpiece fitting into the chamber at the outer end of said stem, an extension on said mouthpiece disposed substantially axially along the whole length of said chamber, said extension having an enlargement arranged substantially midway between the ends of the chamber and having therein a passage registering with the bowl passage in the end wall of the chamber and opening into said chamber at the lower part of said enlargement, said enlargement having a second pasage, said second passage communicating at one end with the bore of the mouthpiece and opening at the other end into said chamber at the upper part of said enlargement, and a resilient swab mounted on the end of the said extension next to the bowl and fitting fluid-tight in the corresponding end part of said chamber in proximity to the perpendicular wall at the end of the said chamber.

MARCEL CHARLES HENRI JACQUEMIN.